United States Patent
Kohara et al.

(10) Patent No.: US 9,832,071 B2
(45) Date of Patent: Nov. 28, 2017

(54) INFORMATION PROCESSING SYSTEM, SETTING ALTERATION METHOD AND COMPUTER PROGRAM

(75) Inventors: Osamu Kohara, Hamamatsu (JP); Seiya Yamada, Hamamatsu (JP); Shuichi Esaki, Hamamatsu (JP)

(73) Assignee: Yamaha Corporation, Hamamatsu-Shi, Shizuoka (JP)

( * ) Notice: Subject to any disclaimer, the term of this patent is extended or adjusted under 35 U.S.C. 154(b) by 215 days.

(21) Appl. No.: 13/699,177

(22) PCT Filed: May 19, 2011

(86) PCT No.: PCT/JP2011/061509
§ 371 (c)(1),
(2), (4) Date: Nov. 20, 2012

(87) PCT Pub. No.: WO2011/148848
PCT Pub. Date: Dec. 1, 2011

(65) Prior Publication Data
US 2013/0073701 A1 Mar. 21, 2013

(30) Foreign Application Priority Data
May 24, 2010 (JP) ................................ 2010-118066

(51) Int. Cl.
*H04L 12/24* (2006.01)
*G06F 9/445* (2006.01)
(Continued)

(52) U.S. Cl.
CPC .............. *H04L 41/08* (2013.01); *G06F 9/445* (2013.01); *G06F 9/44505* (2013.01);
(Continued)

(58) Field of Classification Search
CPC ...... G06Q 10/08; G06Q 20/20; G06Q 20/203; G06Q 10/083; G06Q 10/0833;
(Continued)

(56) References Cited

U.S. PATENT DOCUMENTS 5,784,563 A * 7/1998 Marshall et al. ............. 709/221
5,826,000 A * 10/1998 Hamilton ....................... 714/4.1
(Continued)

FOREIGN PATENT DOCUMENTS

CN 1731875 A 2/2006
CN 101221505 A 7/2008
(Continued)

OTHER PUBLICATIONS

English Translation of JP 2002117134 A; Kobayashi, Michio.*
(Continued)

*Primary Examiner* — Ramy M Osman
(74) *Attorney, Agent, or Firm* — Crowell & Moring LLP

(57) ABSTRACT

A manufacturer's in-house server receives serial numbers from BD players, and transmits the received serial numbers to an SCM server. The SCM server collates the serial numbers into a control table, and transmits information to the manufacturer's in-house server such as information showing which dispatch destination and sales outlet each BD player passed through before being installed in a user's home (i.e., distribution information). In accordance with the collated control table, the manufacturer's in-house server then transmits flags that are used to make settings appropriate to each BD player. Each BD player then alters its own settings in accordance with its received flag. For example, a setting may be made to start up an application for an information delivery service (i.e., a delivery service for contents such as moving pictures and the like) that the BD player is to be connected to.

8 Claims, 7 Drawing Sheets

(51) Int. Cl.
*H04L 29/08* (2006.01)
*G06F 17/30* (2006.01)
*G06Q 10/08* (2012.01)
*G06Q 10/10* (2012.01)

(52) U.S. Cl.
CPC ......... *G06F 17/3087* (2013.01); *G06Q 10/08* (2013.01); *G06Q 10/10* (2013.01); *H04L 41/0803* (2013.01); *H04L 67/303* (2013.01)

(58) Field of Classification Search
CPC .. G06Q 10/087; G06Q 10/0875; G06F 9/445; G06F 9/44505; G06F 17/3087; G06F 17/30528; G06F 17/30241; H04L 67/34; H04L 41/08; H04L 41/0803; H04L 41/0866
USPC .................................. 709/221, 239; 713/100
See application file for complete search history.

(56) References Cited

U.S. PATENT DOCUMENTS

| | | | | |
|---|---|---|---|---|
| 6,167,567 | A * | 12/2000 | Chiles et al. | 717/173 |
| 6,212,585 | B1 * | 4/2001 | Chrabaszcz | H04L 29/06 709/220 |
| 7,761,613 | B2 * | 7/2010 | Chen et al. | 710/10 |
| 8,171,143 | B2 * | 5/2012 | Massam et al. | 709/227 |
| 2004/0203909 | A1 * | 10/2004 | Koster | 455/456.1 |
| 2005/0049923 | A1 | 3/2005 | Tanaka et al. | |
| 2007/0186286 | A1 | 8/2007 | Shim et al. | |
| 2008/0162675 | A1 * | 7/2008 | Bolay et al. | 709/221 |
| 2009/0055816 | A1 * | 2/2009 | Akada | 717/168 |
| 2009/0061890 | A1 * | 3/2009 | Andreasson et al. | 455/456.1 |
| 2009/0089166 | A1 * | 4/2009 | Happonen | H04L 67/20 705/14.55 |
| 2009/0293051 | A1 * | 11/2009 | Krywaniuk | 717/173 |

FOREIGN PATENT DOCUMENTS

| | | |
|---|---|---|
| CN | 101350999 A | 1/2009 |
| JP | 2001-34249 A | 2/2001 |
| JP | 2002-117134 A | 4/2002 |
| JP | 2002-159068 A | 5/2002 |
| JP | 2005-78166 A | 3/2005 |
| JP | 2006-189974 A | 7/2006 |
| JP | 2009-48584 A | 3/2009 |
| JP | 2009-75644 A | 4/2009 |

OTHER PUBLICATIONS

English Translation of JP 2002159068 A; Takano, Yoshiyuki.*
English Translation of JP 2006189974 A; Tanahashi, Takeo.*
European Search Report dated Apr. 23, 2014 (10 pages).
"Provisioning"—Wikipedia, the free encyclopedia, URL:http://en.wikipedia.org/w/index.php?title=Provisioning&olded=355941210, Apr. 14, 2010, four (4) pages, XP055113143.
"TR-069"—Wikipedia, the free encyclopedia, URL:http://en.wikipedia.org/w/index.php?title=TR-069&oldid=362808649, May 18, 2010, two (2) pages, XP055113145.
Sosinsky, "Microsoft Windows Server 1-8 2008: Implementation and Administration" Feb. 11, 2008, pp. 49-52, Windows Deployment Services, Wiley Publishing, Indianapolis, Indiana, USA.
"Home Theater Personal Computer"—Wikipedia, the free encyclopedia, URL:http://en.wikipedia.org/w/index.php?title=Home_Theater_Personal_Computer&oldid=74417907 May 16, 2010, 11 pages, XP055113146, with English translation.
International Search Report dated Jun. 21, 2011 including English-language translation (Three (3) pages).
Japanese Office Action dated Aug. 5, 2014, with English translation (five (5) pages.
Summons to Attend Oral Proceedings issued in European counterpart application No. 11786547.7-1958 / 2579161 dated Jun. 10, 2016 (Twelve (12) pages).
Karim Yaghmour et al. "Building Embedded Linux Systems", Aug. 25, 2008, O'Reilly, XP055275166, 85 total pages.
Vikas Gupta, "Comdex Computer Course Kit Windows Vista with Microsoft Office 2007, Professional ed", Dec. 31, 2008, Wiley, XP055275160, 3 total pages.
European Search Report issued in European counterpart application No. 11786547.7-1958 / 2579161 dated Jun. 10, 2016 (Twelve (12) pages).
European Office Action dated Mar. 23, 2015 (Ten (10) pages).
Chinese Office Action dated Mar. 30, 2015, with English translation (Fourteen (14) pages).
Anonymous: "TR-069—CPE WAN Management Protocol v1.1 Issue 1 Amendment 2", The Broadband Forum, Dec. 31, 2007 (Dec. 31, 2007), XP055176930, Retrieved from the Internet: URL: http://www.broadband-forum.org/technical/download/TR-069_Amendment-2.pdf.

* cited by examiner

FIG. 4A

| SERIAL NUMBER | MACHINE NAME | DISPATCH DESTINATION | LANGUAGE | GUI | EXECUTED APPLICATION | SALES OUTLET |
|---|---|---|---|---|---|---|
| 1014-19 | BD-1 | COUNTRY A | ENGLISH | YAMAHA | SERVICE A | |

| SERIAL NUMBER | MACHINE NAME | DISPATCH DESTINATION | LANGUAGE | GUI | EXECUTED APPLICATION | SALES OUTLET |
|---|---|---|---|---|---|---|
| 1014-19 | BD-1 | COUNTRY A | ENGLISH | SALES OUTLET A | SERVICE A | SALES OUTLET A |

FIG. 4B

| SERIAL NUMBER | MACHINE NAME | DISPATCH DESTINATION | LANGUAGE | GUI | EXECUTED APPLICATION | SALES OUTLET |
|---|---|---|---|---|---|---|
| 1014-10 | BD-1 | COUNTRY A | ENGLISH | YAMAHA | SERVICE A | |

| SERIAL NUMBER | MACHINE NAME | DISPATCH DESTINATION | LANGUAGE | GUI | EXECUTED APPLICATION | SALES OUTLET |
|---|---|---|---|---|---|---|
| 1014-10 | BD-1 | COUNTRY B | FRENCH | SALES OUTLET B | SERVICE B | SALES OUTLET B |

FIG. 4C

| SERIAL NUMBER | MACHINE NAME | DISPATCH DESTINATION | LANGUAGE | GUI | EXECUTED APPLICATION | SALES OUTLET |
|---|---|---|---|---|---|---|
| 1014-12 | BD-1 | COUNTRY A | ENGLISH | YAMAHA | SERVICE A | |

| SERIAL NUMBER | MACHINE NAME | DISPATCH DESTINATION | LANGUAGE | GUI | EXECUTED APPLICATION | SALES OUTLET |
|---|---|---|---|---|---|---|
| 1014-12 | BD-1 | COUNTRY B | FRENCH | SALES OUTLET C | SERVICE C | SALES OUTLET C |

| SERIAL NUMBER | 1014-19 |
|---|---|
| MACHINE TYPE/ MODEL NUMBER | BD-1 |
| DISPATCH DESTINATION | COUNTRY A |
| LANGUAGE | ENGLISH |
| GUI | YAMAHA |
| FIRMWARE | VER.1.5 |
| EXECUTED APPLICATION | SERVICE A |
| SALES OUTLET | |

| SERIAL NUMBER | 1014-19 |
|---|---|
| MACHINE TYPE/ MODEL NUMBER | BD-1 |
| DISPATCH DESTINATION | COUNTRY A |
| LANGUAGE | ENGLISH |
| GUI | SALES OUTLET A |
| FIRMWARE | VER.1.5 |
| EXECUTED APPLICATION | SERVICE A |
| SALES OUTLET | SALES OUTLET A |

| SERIAL NUMBER | 1014-10 |
|---|---|
| MACHINE TYPE/ MODEL NUMBER | BD-1 |
| DISPATCH DESTINATION | COUNTRY A |
| LANGUAGE | ENGLISH |
| GUI | YAMAHA |
| FIRMWARE | VER.1.5 |
| EXECUTED APPLICATION | SERVICE A |
| SALES OUTLET | |

| SERIAL NUMBER | 1014-10 |
|---|---|
| MACHINE TYPE/ MODEL NUMBER | BD-1 |
| DISPATCH DESTINATION | COUNTRY B |
| LANGUAGE | FRENCH |
| GUI | SALES OUTLET B |
| FIRMWARE | VER.1.5 |
| EXECUTED APPLICATION | SERVICE B |
| SALES OUTLET | SALES OUTLET B |

| SERIAL NUMBER | 1014-12 |
|---|---|
| MACHINE TYPE/ MODEL NUMBER | BD-1 |
| DISPATCH DESTINATION | COUNTRY A |
| LANGUAGE | ENGLISH |
| GUI | YAMAHA |
| FIRMWARE | VER.1.5 |
| EXECUTED APPLICATION | SERVICE A |
| SALES OUTLET |  |

| SERIAL NUMBER | 1014-12 |
|---|---|
| MACHINE TYPE/ MODEL NUMBER | BD-1 |
| DISPATCH DESTINATION | COUNTRY B |
| LANGUAGE | FRENCH |
| GUI | SALES OUTLET C |
| FIRMWARE | VER.1.5 |
| EXECUTED APPLICATION | SERVICE C |
| SALES OUTLET | SALES OUTLET C |

INFORMATION PROCESSING SYSTEM, SETTING ALTERATION METHOD AND COMPUTER PROGRAM

TECHNICAL FIELD

The present invention relates to an information processing system, a setting alteration method, and a computer program that transmit and receive various types of information via a network such as the Internet.

Priority is claimed on Japanese Patent Application No. 2010-118066, filed May 24, 2010, the contents of which are incorporated herein by reference.

BACKGROUND ART

Conventionally, a device that transmits information relating to its own specifications to a server (for example, which resolutions it is able to display), and then receives from the server information that is appropriate to its own specifications has been proposed as a device that delivers information (for example, moving pictures) via a network (see, for example, Patent document 1).

Patent document 1: Japanese Patent Application Laid-Open (JP-A) No. 2001-34249

SUMMARY OF THE INVENTION

In some cases, the system and the like that are used by a delivery service vary in accordance with the destination to which a product is dispatched (for example, in accordance with the different countries or regions or the like to which the product may be shipped). Moreover, even if products are shipped to the same dispatch destination, if they have different sales outlets then, in some cases, the delivery services may also be different. In order to deal with different delivery services, the settings of the device are altered (for example, the application software being used may be altered).

In the device described in Patent document 1, because the fact that the dispatch destination that was set at the time of shipping or the sales outlet have changed is not recognized by the device itself, it has no capacity to deal with alterations to the dispatch destination and sales outlet after shipping.

Therefore, conventionally, an ability to make settings appropriate for each product even in cases in which, for example, the dispatch destination and sales outlet are different for each product, has been sought.

This invention has, for example, the following aspects. However, the following description is merely an example, and the present invention is in no way limited by this description.

A first aspect of the present invention is an information processing system and is provided with a server and products. The server is a server within an SCM (Supply Chain Management) control system and includes: a storage device that stores distribution information that controls the distribution of products; and an updating device that updates the distribution information in the storage device in accordance with the distribution of the products. The products are provided with: a communicating device that communicates with the server via a network; and a setting altering device that, when the communicating device is connected to the network, acquires information that corresponds to the distribution information from the server via the communicating device, and then alters settings of its own host product in accordance with the acquired information.

Generally, in an SCM control system, the distribution destination of each product (i.e., which dispatch destination and which sales outlet the product has been distributed to) is controlled. Accordingly, when, after purchasing a product, a user first connects the product to the Internet, by downloading from the server of the SCM control system information (i.e., flags that are used for altering settings or information showing the actual distribution destination) that is used to alter the settings to those that correspond to its own distribution destination, it is possible to automatically alter the settings to those that match the distribution destination and sales outlet.

For example, if settings have been made at the point of shipping such that application software (this will be referred to hereinafter simply as an application) for a default delivery service is started up, then even if the default application does not correspond to the delivery service of the country and sales outlet where the product was actually purchased, simply by connecting to the Internet, an application designed for the shipping destination of the product is started up, and the appropriate information delivery service can be received.

Note that "settings" may include not only the application that is started, but also settings such as the language and user interface (GUI) and the like that are used in a host device. For example, if the language used has been set to English in order for the product to be shipped to a country in the English-speaking sphere, then even if the shipping destination is altered in mid-distribution to another language region, the language used is automatically altered to the appropriate language when the user unpacks the product and connects to the Internet for the first time. Moreover, if the GUI (i.e., the logo and the like at startup) of the product manufacturer is displayed at shipping, this can be automatically altered to display the GUI of the sales outlet.

Specifically, the SCM server and the product perform the following types of information exchange. Namely, the product transmits product specific information (i.e., a serial number and the like) to the SCM server. The SCM server collates distribution information that corresponds to the serial number, and transmits to the product a flag that is used for a setting alteration appropriate to the product whose information was collated. The product then performs a setting alteration operation (i.e. an application startup or the like) in accordance with the received flag.

Note that the product alters its own settings when the distribution destination that was set at the point of shipping differs from the actual distribution destination. The determination of whether or not the distribution destination that was set at the point of shipping differs from the actual distribution destination may be made on the SCM server side, or may be made on the product side.

According to the above-described aspects, it is possible to make settings that are appropriate to a particular product even when the dispatch destination and sales outlets are different for each product.

BRIEF DESCRIPTION OF THE DRAWINGS

FIG. 4A is a view showing a control table.

FIG. 4B is a view showing a control table.

FIG. 4C is a view showing a control table.

BEST MODE FOR CARRYING OUT THE INVENTION

Figure 1:
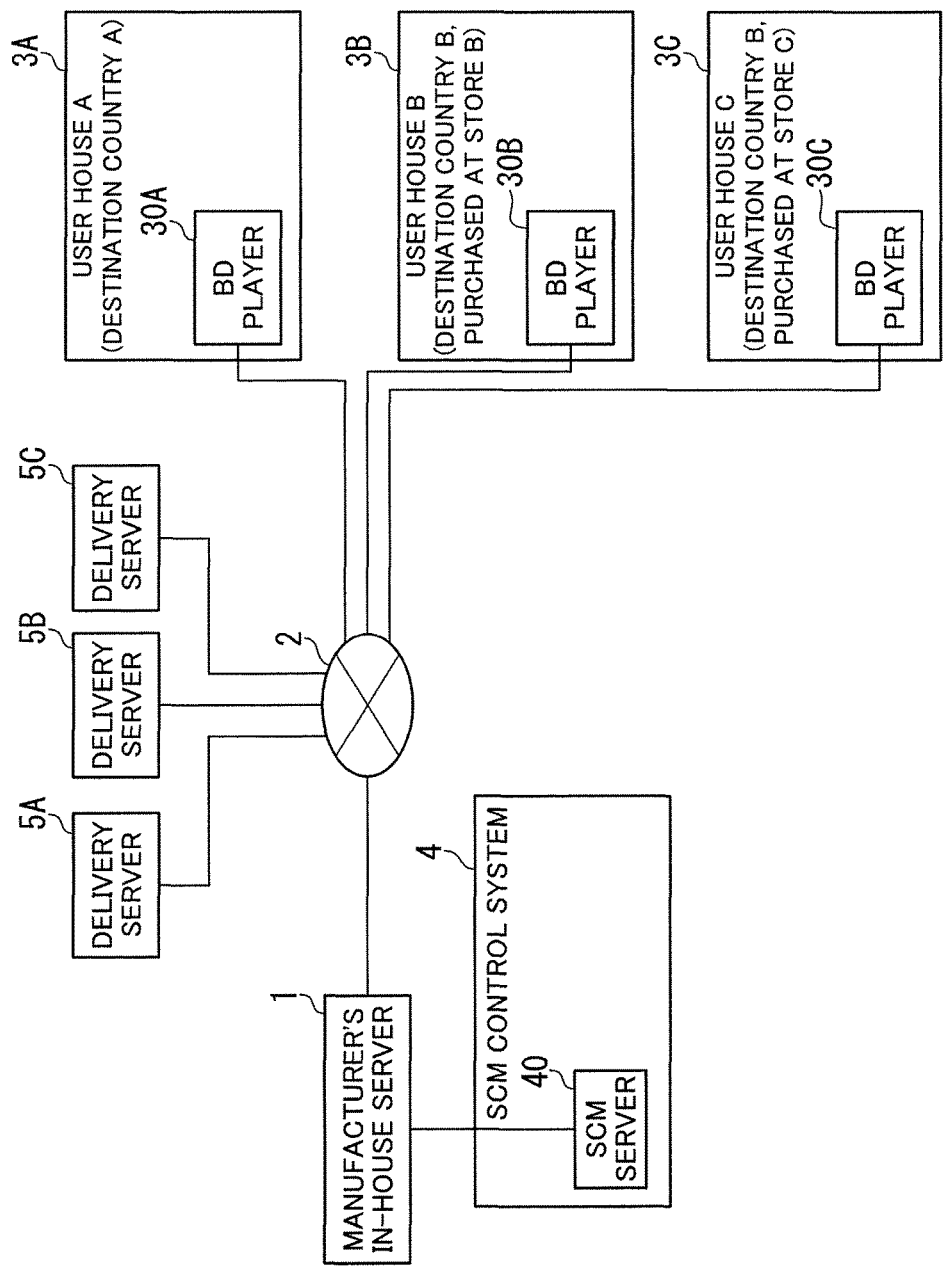
FIG. 1 is a block diagram showing the structure of an information processing system.

FIG. 1 is a block diagram showing the structure of an information processing system according to an embodiment. This information processing system is formed by a manufacturer's in-house server 1, the Internet 2, a BD player 30A that is installed in a user's home 3A, a BD player 30B that is installed in a user's home 3B, a BD player 30C that is installed in a user's home 3C, an SCM server 40 that is installed in an SCM control system 4, and a plurality of delivery servers (i.e., a delivery server 5A, a delivery server 5B, and a delivery server 5C). In FIG. 1, an example is shown in which three products (i.e., BD players) are distributed from the manufacturer to the homes of the respective users, however, in reality, a large number of products are distributed and installed in the homes of individual users. Moreover, the number of delivery servers is not limited to the number used in this example.

The manufacturer's in-house server 1 is located on the premises of the manufacturer which is a source for shipping BD players. The manufacturer's in-house server 1 is connected to the Internet 2 and the SCM control system 4. In FIG. 1, an example is shown in which the manufacturer's in-house server 1 is connected via a LAN to the SCM server 40 of the SCM control system 4, however, it may also be connected via the Internet 2.

The SCM control system 4 controls the distribution of each product using the SCM server 40. Each time a BD player is shipped from the manufacturer, the SCM server 40 acquires and controls information showing the distribution destination of that particular BD player (i.e., which dispatch destination and sales outlet it is being shipped to). Namely, the SCM server 40 stores distribution information showing the distribution situation of each product in an internal storage device (such as an HDD or the like) as a control table, and updates the control table each time in accordance with the acquired information.

The manufacturer's in-house server 1 is connected via the Internet 2 to the BD player 30A, the BD player 30B, and the BD player 30C, which are each located in the home of a user, and transmits and receives various types of information. In the present embodiment, when a BD player has connected to the Internet 2, the manufacturer's in-house server 1 receives information specific to each product from the BD player (such as the serial number thereof and the like), and transmits the received serial number to the SCM server 40. The SCM server 40 collates control tables using serial numbers and transmits to the manufacturer's in-house server 1 information (i.e., distribution information) showing things such as the dispatch destination and sales outlet each BD player has passed through on their way to the users' homes. The manufacturer's in-house server 1 transmits flags that are used to make settings appropriate for each BD player in accordance with the collated information control tables. Each BD player alters its own settings in accordance with the received flags. For example, a setting may be made to start up an application designed for the information delivery service (i.e., a delivery service for contents such as moving pictures and the like) to which the BD player is to connect. As a consequence, even if the delivery server of the information delivery service that the BD player is connected to differs depending on the dispatch destination, it is possible to connect to an appropriate information delivery service. In this manner, in the information processing system of the present embodiment, it is possible to automatically make settings that are appropriate to each product even when the dispatch destination and sales outlet of each product are different.

Note that in the present embodiment, the manufacturer's in-house server 1 is not an essential component element. It is also possible to employ a system in which each BD player is connected directly to a server or the like within the SCM control system.

Figure 2:
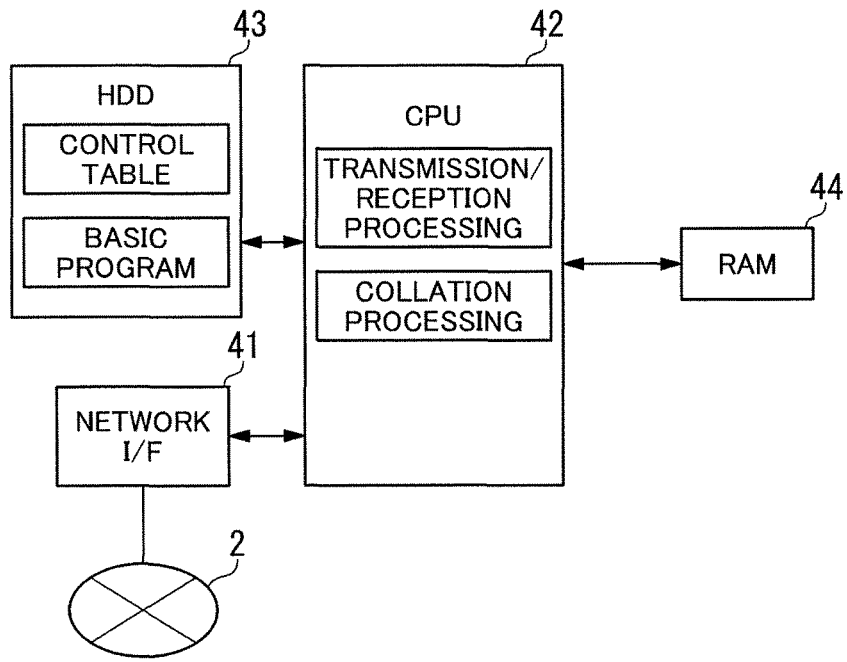
FIG. 2 is a block diagram showing the structure of a BD (Blu-ray Disc) player.
Figure 3:
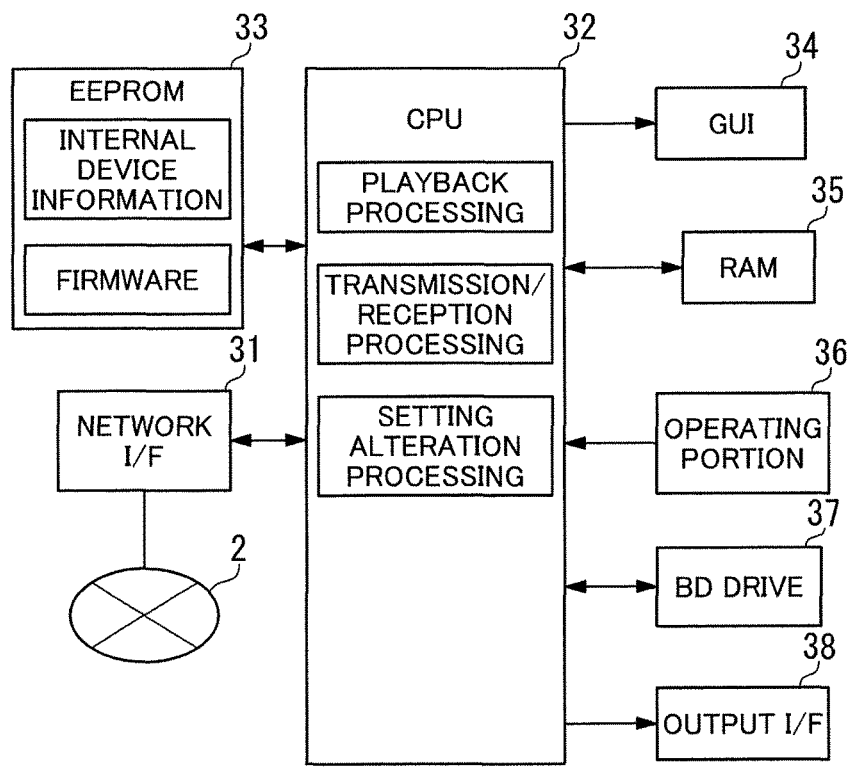
FIG. 3 is a block diagram showing the structure of an SCM server.

Hereinafter, the specific structure and operation of each device will be described. FIG. 2 is a block diagram showing the principal structure of the SCM server 40. FIG. 3 is a block diagram showing the principal structure of the BD player 30A. In FIG. 3, the structure of the BD player 30A is shown as representative of a BD player and the structures and functions of the other BD players 30B and 30C are the same as those of the BD player 30A.

In FIG. 2, the SCM server 40 is provided with a network interface (I/F) 41, a CPU 42, an HDD 43, and RAM 44.

A basic program that is required in order for the server to operate is stored together with the control tables on the HDD 43. The CPU 42 (i.e., an updating device) opens the basic program stored on the HDD 43 in the RAM 44, and performs various operations relating to the control of the product distribution. At each stage of the product distribution, the CPU 42 receives from the dispatch destinations and sales outlets and the like information showing which dispatch destination and sales outlet each BD player is being shipped to at the current point in time, and then updates the control tables.

FIGS. 4A through 4C show control tables. FIG. 4A is the control table for the BD player 30A, and shows changes in the control table between when the product was shipped and after it was installed in the user's home. FIG. 4B is the control table for the BD player 30B, and shows changes in the control table between when the product was shipped and after it was installed in the user's home. FIG. 4C is the control table for the BD player 30C, and shows changes in the control table between when the product was shipped and after it was installed in the user's home. The control tables record information such as the serial number (No.), machine type, dispatch destination, language, GUI, executing application, sales outlet and the like for each individual product.

When a product is shipped, in the default state all of the BD players are stored in the control table in accordance with their planned dispatch destination. In the example of the present embodiment, all of the dispatch destinations are stored as 'COUNTRY A', the language as 'ENGLISH', the GUI as 'Yamaha', the executing application as 'SERVICE A', and the information about the sales outlet as N/A. Namely, when shipped, all of the BD players are set so as to execute an application for a 'delivery service A' which is only provided in the dispatch destination of a country A.

As is shown in FIG. 4A, in the control table for the BD player 30A, because the BD player 30A is actually distributed to the dispatch destination of the country A, and is then installed in the user's home 3A via a sales outlet A, the information about the dispatch destination is 'COUNTRY A', the language is 'ENGLISH', the GUI is updated to 'SALES OUTLET A', the executing application is 'SERVICE A', and the sales outlet is updated to 'SALES OUTLET A'. Namely, the GUI is updated to the specification of the sales outlet A, and the new sales outlet information is added.

In the same way, as is shown in FIG. 4B, in the control table for the BD player 30B, because the BD player 30B is distributed to the dispatch destination of a country B, and is then installed in the user's home 3B via a sales outlet B, the information about the dispatch destination is updated to 'COUNTRY B', the language is updated to 'FRENCH', the GUI is updated to 'SALES OUTLET B', the executing application is updated to 'SERVICE B', and the sales outlet is updated to 'SALES OUTLET B'. Namely, dispatch destination is updated to 'COUNTRY B', the language used is updated to 'FRENCH', the GUI is updated to the specification of the sales outlet B, the new sales outlet information is added, the application to be executed is then altered to the specification of 'SERVICE B' and recorded.

In the same way, as is shown in FIG. 4C, in the control table for the BD player 30C, because the BD player 30C is distributed to the dispatch destination of a country C, and is then installed in the user's home 3C via a sales outlet C, the information about the dispatch destination is updated to 'COUNTRY B', the language is updated to 'FRENCH', the GUI is updated to 'SALES OUTLET C', the executing application is updated to 'SERVICE C', and the sales outlet is updated to 'SALES OUTLET C'. Namely, dispatch destination is updated to 'COUNTRY B', the language used is updated to 'FRENCH', the GUI is updated to the specification of the sales outlet C, the new sales outlet information is added, the application to be executed is then altered to the specification of 'SERVICE C' and recorded.

The dispatch destinations of the BD player 30B and the BD player 30C are both the country B, however, the sales outlets thereof are different. Accordingly, the applications to be executed when the delivery service is received are also different.

Next, in FIG. 3, the BD player 30A is provided with a network I/F 31, a CPU 32, an EEPROM 33, a graphical user interface (GUI) 34, RAM 35, an operating portion 36, a BD drive 37, and an output I/F 38.

Figure 6:
FIG. 6 is a view showing internal device information stored in a BD player.
Figure 7:
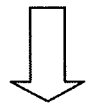
FIG. 7 is a view showing internal device information stored in a BD player.
Figure 8:
FIG. 8 is a view showing internal device information stored in a BD player.

The EEPROM 33 is rewritable flash memory and is used to store firmware and internal device information (see FIG. 6, FIG. 7, and FIG. 8). Various types of applications, languages, GUI display images and the like are archived in the firmware. The CPU 32 expands the firmware stored in the EEPROM 33 in the RAM 34, and executes various types of operations. The basic operation of the CPU is to receive inputs of operating signals that correspond to operations performed by a user via the operating portion 36, and to then perform an action that corresponds to the operation performed by the user. For example, it may perform playback processing by reading contents data from a BD (Blu-ray disc) that has been inserted into the BD drive 37, and then outputting video signals and audio signals to the output I/F 38.

When a user purchases a BD player and installs it in their home, they connect the network I/F 31 to the Internet 2, then connect the BD player to a power supply (not shown) and activate it. As a result, the CPU 32 reads the firmware stored in the EEPROM 33, and expands it in the RAM 35, and then performs processing as a setting altering device. Namely, when the BD player is first activated after being shipped, the CPU 32 makes the initial settings. These initial settings include the aforementioned language to be used, the contents (i.e. whether the product manufacturers name is to be displayed, or whether the name of the sales outlet is to be displayed, or the like) to be displayed on the GUI 34, the settings for the applications that are to be started up, and the like. Note that if the BD player is activated without being connected to the Internet 2, the default initial settings from when the product was shipped are executed, and the following initial settings are reset when the BD player is first connected to the Internet 2.

Figure 5:
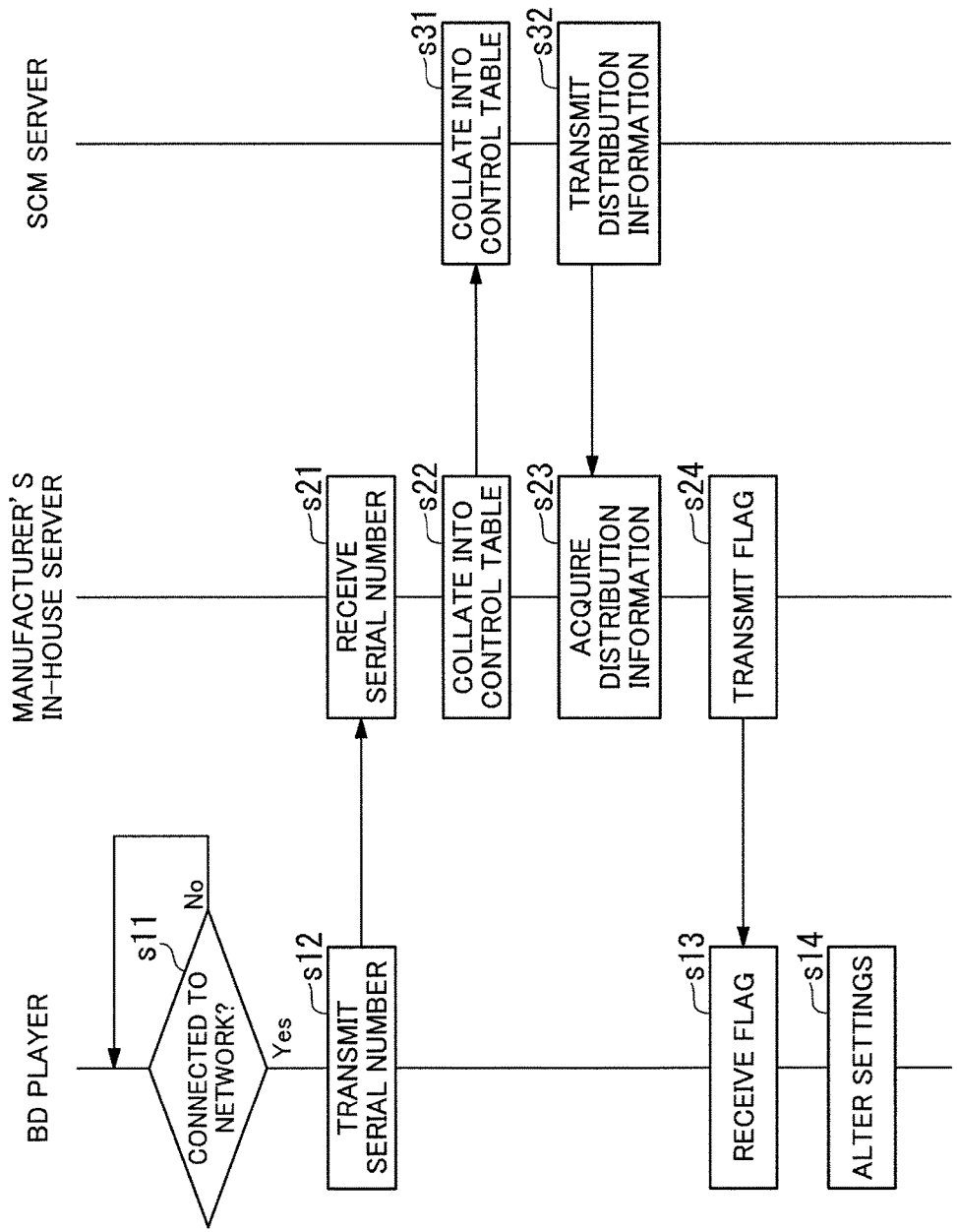
FIG. 5 is a flowchart showing operations performed at startup.

FIG. 5 is a flowchart showing an operation when the BD player is activated. The CPU 32 confirms whether or not the BD player is connected to a network at the initial activation (s11). If the BD player is connected to a network, then in order to execute the initial settings, firstly, the serial number is stored in the EEPROM 33 is transmitted to the manufacturer's in-house server 1 (s12). The manufacturer's in-house server 1 receives the serial number from the BD player (s21). It then transmits the received serial number to the SCM server 40 where it is collated into the control table (s22).

When the CPU 42 of the SCM server 40 receives the serial number from the manufacturer's in-house server 1 via the network I/F 41, it collates it into the control table stored in the HDD 43 (s31), and transmits the relevant product distribution information to the manufacturer's in-house server 1 (s32).

The manufacturer's in-house server 1 receives the distribution information from the SCM server (s23), and determines which contents are to have their settings altered. It then transmits flags in order for the setting alterations to be performed (s24).

The CPU 32 of the BD player receives the aforementioned flags from the manufacturer's in-house server 1 (s13), and alters the settings of its own host player in accordance with the received flags.

For example, in the BD player 30A, because the GUI is altered to the specifications of the sales outlet A, and new sales outlet information is added, a flag is received in the control table of the SCM server 40 instructing that actions to alter the GUI to the specifications of the sales outlet A and to add the new sales outlet information to the internal device information be performed. As is shown in FIG. 6, the internal device information includes such information as the serial number (No.), the machine type/model name, the dispatch destination, the language, the GUI, the firmware version, the application to be executed, the sales outlet, and the like. Accordingly, of this internal device information, the CPU 32 alters the GUI from [YAMAHA] to [SALES OUTLET A], and adds [SALES OUTLET A] to the sales outlet category. The CPU 32 then actually alters the GUI (i.e., the logo at startup and the like) to the specifications of [SALES OUTLET A]. In the BD player 30A, the application for the delivery service A is then actually executed, and it becomes possible to receive delivery services such as receiving contents such as moving images from the delivery server 5A shown in FIG. 1.

Moreover, as is shown in FIG. 7, in the case of the BD player 30B, the dispatch destination is altered to the country B, the language used is altered to French, the GUI is altered to the specifications of the sales outlet B, new sales outlet information is added, and the application to be executed is altered to the specifications of [SERVICE B] in the control table of the SCM server 40. Accordingly, the CPU 32 alters the dispatch destination to [COUNTRY B], alters the language used to [FRENCH], alters the GUI to [SALES OUTLET B], adds [SALES OUTLET B] to the sales outlet category, and alters the application to be executed to [SERVICE B]. The CPU 32 then actually changes the used language that is displayed to the user to French, and alters the logo at startup and the like to the specifications of [SALES OUTLET B]. In addition, a setting is made so that the application designed for the delivery service B is executed. Accordingly, the application not for the delivery service A, but for the delivery service B (for example, a unique delivery service that is conducted in the sales outlet B in the country B) is then executed, and it becomes possible to receive delivery services from the delivery server 5B shown in FIG. 1.

In the same way, as is shown in FIG. 8, in the case of the BD player 30C, the dispatch destination is altered to the country B, the language used is altered to French, the GUI is altered to the specifications of the sales outlet C, new sales outlet information is added, and the application to be executed is altered to the specifications of [SERVICE C] in the control table of the SCM server 40. Accordingly, the CPU 32 alters the dispatch destination to [COUNTRY B], alters the language used to [FRENCH], alters the GUI to [SALES OUTLET C], adds [SALES OUTLET C] to the sales outlet category, and alters the application to be executed to [SERVICE C]. The CPU 32 then actually changes the used language that is displayed to the user to French, and alters the logo at startup and the like to the specifications of [SALES OUTLET C]. In addition, a setting is made so that the application designed for the delivery service C is executed. Accordingly, the application not for the delivery service A or for the delivery service B, but for the delivery service C (for example, a unique delivery service that is conducted in the sales outlet C in the country B) is then executed, and it becomes possible to receive delivery services from the delivery server 5C shown in FIG. 1.

In particular, as in the case of the BD player 30B and the BD player 30C, there are cases when the delivery services for a BD player purchased at the sales outlet B and a BD player purchased at the sales outlet C which are both located in the same country B will be mutually different. In this case, conventionally, it has been necessary for a user to either manually download an application to be executed and then alter it or the like, or to set an individual application designed for each sales outlet at the time of shipping or the like. However, in the information processing system of the present embodiment, it is not necessary for a user to perform manual alterations, nor is it necessary to set an individual application designed for each sales outlet, but instead a suitable application corresponding to the distribution destination is automatically executed. If, as is the case conventionally, an individual application designed for each sales outlet is set at the time of shipping, then if the sales outlet is abruptly changed, or if the BD player is forwarded (i.e., resold) from one sales outlet to another sales outlet, then it is not possible for a suitable delivery service to be received, however, by using the information processing system of the present embodiment, a suitable application corresponding to the distribution destination is automatically executed when a user first activates the BD player. As a result of this, even if the sales outlet is abruptly changed, or if the BD player is forwarded (i.e., resold) from one sales outlet to another sales outlet, each time this happens the control table in the SCM server is updated, and a suitable application is executed.

Note that in the flowchart shown in FIG. 5, it is also possible to employ a structure in which the information that is transmitted from the manufacturer's in-house server 1 to the BD player is not in the form of flags, but instead, the actual distribution information itself is transmitted to the BD player, and the BD player itself determines from the received distribution information which contents need to have their settings altered, and then alters those settings.

Moreover, in the flowchart shown in FIG. 5, in a system in which each BD player is directly connected to the server or the like within an SCM control system, it is also possible for the SCM server 40 to act as a substitute and execute the operations of the manufacturer's in-house server 1. Namely, the SCM server 40 is able to receive serial numbers and collate these into the control tables, and transmit flags (or the actual distribution information itself) indicating that the settings are to be altered to the BD players in accordance with the distribution information.

Moreover, in the above-described embodiment, when the SCM server receives information (i.e., serial numbers and the like) specific to each product from a BD player, it is also possible for the SCM server, for example, to analyze the address of the transmission source, and determine the country or region in which the BD player is installed and then set the distribution destination and language in the control table shown in FIG. 4. By doing this, the SCM server is able to specify the setting of the language of the BD player with a far greater degree of accuracy. By performing processing such as this, even if a user, for example, purchases a BD player in France but then installs the BD player in England, the BD player is able to display in English.

Moreover, in the above-described embodiment, if, for example, a sales outlet sells a BD player as part of a set together with a television made by another manufacturer, the settings can be altered so as to match the television that is sold as part of the set, or so as to match the manufacturer of the television or the like. For example, if a BD player is sold as part of a set in combination with a particular television, a distributor along the distribution route, or a user of the SCM server, or a controller or the like registers the information of the GUI corresponding to the television that is to be sold as part of the relevant set in the GUI column in the control table shown in FIG. 4. When the television is being installed, the BD player receives the GUI information corresponding to this particular television from the SCM server, and displays the GUI that corresponds to this particular television. Conventionally, it has been necessary for each sales outlet to individually perform alterations such as this. However, by employing the above-described embodiment, even in a combined sale such as this, the settings can be altered with flexibility.

Moreover, a BD player is used as an example in the above-described embodiment, however, the above-described embodiment is not limited to BD players and may also be applied, for example, to mobile telephones, vehicle navigation systems and the like.

INDUSTRIAL APPLICABILITY

The present invention can be applied to household electrical appliances whose settings differ depending on their distribution destination or sales outlet or the like.

DESCRIPTION OF THE REFERENCE NUMERALS

Description of the Reference Numerals

1 . . . Manufacturer's in-house server
2 . . . Internet
4 . . . SCM control system
5A . . . Delivery server
5B . . . Delivery server 5C . . . Delivery server
30A . . . BD player
30B . . . BD player
30C . . . BD player
40 . . . SCM server

The invention claimed is:

1. An information processing system comprising a server and an electronic device, wherein
the server comprises:
a first network interface configured to communicate with the electronic device via a network;
a storage device configured to store initial distribution information which comprises an expected dispatch destination and which relates to distribution of the electronic device while associating the initial distribution information with electronic device specific information, wherein the storage device is also configured to store an actual distribution destination of the electronic device; and
an updating device configured to update the initial distribution information in the storage device in response to the actual distribution destination of the electronic device differing from the expected dispatch destination, and wherein
the electronic device comprises:
a second network interface configured to communicate with the server via the network; and
a setting altering device that, when the second network interface is connected to the network, is configured to acquire from the server via the second network interface setting alteration information corresponding to the actual distribution destination in response to transmission of the electronic device specific information, and then alters settings of the electronic device in accordance with the acquired setting alteration information, which includes a sales outlet,
wherein the setting alteration information is provided by the server to the setting altering device in response to the actual distribution destination differing from the expected distribution destination, and
wherein the setting alteration information is generated by the server for those settings of the electronic device that are affected by the actual distribution destination differing from the expected distribution destination.

2. The information processing system according to claim 1, wherein the settings of the electronic device are used for starting up application firmware that corresponds to a distribution destination.

3. The information processing system according to claim 1 wherein the settings of the electronic device relate to at least one of language used by the electronic device and user interface.

4. The information processing system according to claim 1, wherein the setting altering device transmits information that is specific to the electronic device to the server via the second network interface, and
the server collates the distribution information of the electronic device in accordance with the information that is specific to the electronic device, and transmits flags that are used to alter the settings to the electronic device.

5. The information processing system according to claim 1, further comprising a plurality of delivery servers delivering information to the electronic device via the Internet, wherein
the electronic device connects to one of the plurality of delivery servers that corresponds to the settings altered by the setting altering device, and then receives the delivered information.

6. The information processing system according to claim 1, wherein,
the setting altering device only alters the settings of the electronic device if the expected distribution destination that was set when the electronic device was shipped differs from the actual distribution destination.

7. A computer program product used with an information processing system including a server and an electronic device, the computer program product comprising a non-transitory computer-readable recording medium of the electronic device having processor executable code embodied therein, the processor executable code comprising:
an instruction of, when in response to detecting a connection to a network, and in response to transmission of electronic device specific information associated with actual distribution information which comprises an actual dispatch destination and which relates to the distribution of the electronic device, receiving setting alteration information from the server that corresponds to the actual distribution information; and
an instruction of altering settings of the electronic device in accordance with the received setting alteration information, which includes a sales outlet, only if the actual distribution destination differs from an expected distribution destination that was set when the electronic device was shipped,
wherein the setting alteration information is provided by the server in response to the actual distribution destination differing from the expected distribution destination, and
wherein the setting alteration information is generated by the server for those settings of the electronic device that are affected by the actual distribution destination differing from the expected distribution destination.

8. A setting alteration method of an electronic device in an information processing system including a server and the electronic device comprising:
a step of, when in response to detecting a connection to a network, and in response to transmission of electronic device specific information associated with actual distribution information which comprises an actual dispatch destination and which relates to the distribution of the electronic device, receiving setting alteration information from the server that corresponds to the actual distribution information; and
a step of altering settings of the electronic device in accordance with the acquired setting alteration information, which includes a sales outlet, only if the actual distribution destination differs from an expected distribution destination that was set when the electronic device was shipped,
wherein the setting alteration information is provided by the server in response to the actual distribution destination differing from the expected distribution destination, and
wherein the setting alteration information is generated by the server for those settings of the electronic device that are affected by the actual distribution destination differing from the expected distribution destination.

* * * * *